United States Patent
Fujisaki et al.

(10) Patent No.: US 10,123,180 B2
(45) Date of Patent: Nov. 6, 2018

(54) INFORMATION DELIVERY METHOD, INFORMATION DELIVERY APPARATUS, AND STORAGE MEDIUM

(71) Applicant: FUJITSU LIMITED, Kawasaki-shi, Kanagawa (JP)

(72) Inventors: Naoya Fujisaki, Yokohama (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/210,996

(22) Filed: Jul. 15, 2016

(65) Prior Publication Data
US 2017/0041765 A1 Feb. 9, 2017

(30) Foreign Application Priority Data
Aug. 3, 2015 (JP) ................. 2015-153420

(51) Int. Cl.
| | |
|---|---|
| H04W 4/80 | (2018.01) |
| H04W 64/00 | (2009.01) |
| H04W 4/04 | (2009.01) |
| G08G 1/01 | (2006.01) |
| G08G 1/0967 | (2006.01) |
| G01C 21/36 | (2006.01) |

(52) U.S. Cl.
CPC ........ H04W 4/046 (2013.01); G01C 21/3679 (2013.01); G08G 1/0112 (2013.01); G08G 1/0129 (2013.01); G08G 1/0141 (2013.01); G08G 1/096716 (2013.01); G08G 1/096741 (2013.01); G08G 1/096775 (2013.01); H04W 4/80 (2018.02); H04W 64/00 (2013.01)

(58) Field of Classification Search
CPC ......... G08G 1/01; H04L 67/18; H04W 4/008; H04W 4/046; H04W 64/00
See application file for complete search history.

(56) References Cited

U.S. PATENT DOCUMENTS

| | | | |
|---|---|---|---|
| 2010/0057357 A1* | 3/2010 | Miyata | G01C 21/3614 701/533 |
| 2012/0129454 A1* | 5/2012 | Suzuki | H04B 1/74 455/41.2 |
| 2014/0287779 A1* | 9/2014 | O'Keefe | H04W 4/02 455/456.3 |
| 2017/0006430 A1* | 1/2017 | Chao | H04W 4/029 |

FOREIGN PATENT DOCUMENTS

| | | |
|---|---|---|
| JP | 2002-340571 | 11/2002 |
| JP | 2004-110101 | 4/2004 |
| JP | 2009-019976 | 1/2009 |
| JP | 2010-060433 | 3/2010 |
| JP | 2013-117604 | 6/2013 |

* cited by examiner

*Primary Examiner* — Frantz Bataille
(74) *Attorney, Agent, or Firm* — Fujitsu Patent Center

(57) ABSTRACT

A method performed by a computer communicating with a terminal. The method includes when the computer enters a first area surrounding a second area together with the terminal, collecting one or more application contents corresponding to the second area from a service; when the computer enters the second area together with the terminal, delivering the collected application contents to the terminal; when the computer exits the second area together with the terminal, requesting the terminal to delete or nullify the delivered application contents; and when the computer exits the first area together with the terminal, organizing the collected application contents.

12 Claims, 15 Drawing Sheets

FIG.4

| AREA DEFINITION INFORMATION | SPOT NAME (NAME OF CENTRAL PLACE OF AREA) | AREA TYPE | SECOND AREA LOCATION #1 (LATITUDE, LONGITUDE) | SECOND AREA LOCATION #2 (LATITUDE, LONGITUDE, RADIUS (m)) | SECOND AREA EVENT DEFINITION | FIRST AREA LOCATION #1 (LATITUDE, LONGITUDE) | FIRST AREA LOCATION #2 (LATITUDE, LONGITUDE, RADIUS (m)) | FIRST AREA EVENT DEFINITION |
|---|---|---|---|---|---|---|---|---|
| | XX TEMPLE | SQUARE | 35.717526 139.792989 | 35.711324 139.798053 | AREA-IN: DELIVERY AREA-OUT: DELETION | 35.727526 139.802989 | 35.721324 139.808053 | AREA-IN: COLLECTION AREA-OUT: COMPILATION |
| | YY TOWER | CIRCLE | 35.655394 139.747455 | 400.0 | AREA-IN: DELIVERY AREA-OUT: DELETION | 35.655394 139.747455 | 800.0 | AREA-IN: COLLECTION AREA-OUT: COMPILATION |
| | ... | | | | | | | |

FIG.5A

| ROUTE INFORMATION 2014.12.31 | SPOT ID | 1 | 2 | 3 | 4 |
|---|---|---|---|---|---|
| | SPOT NAME | XX TEMPLE | YY OUTER MARKET | ZZ TOWER | TOKYO METROPOLITAN GOVERNMENT BUILDING |

FIG.5B

| ROUTE INFORMATION 2015.1.10 | SPOT ID | 110 | 111 | 112 | 113 | 114 |
|---|---|---|---|---|---|---|
| | SPOT NAME | AA HOT SPRING | ASAGIRI-KOGEN | NUMAZU | HAKONE | ODAWARA |

FIG.6A

| INFORMATION-DELIVERY SITE INFORMATION | PRIORITY | TARGET SITE | COLLECTION POLICY |
|---|---|---|---|
| | A | WWW SITE | TOP 5 SEARCH HITS | A |
| | B | ZZZ SITE | TOP 5 SEARCH HITS | B NOT A |
| | C | VVV SITE | TOP 10 SEARCH HITS | C NOT (B NOT A) |

A OR (B NOT A) OR (C NOT (B NOT A))

FIG.6B

| | SPOT ID | SPOT NAME | DELIVERY FACILITY | RECEPTION METHOD | CHANNEL |
|---|---|---|---|---|---|
| INFORMATION-DELIVERY SPOT INFORMATION | 1 | AAA TEMPLE | DD STREET | ONE-SEGMENT BROADCASTING | 13/14 |
| | 2 | BBB TOWER | YYY TOWER TOKYO | ONE-SEGMENT BROADCASTING | 13/14 |
| | 3 | CCC AQUARIUM | EE AQUARIUM | ONE-SEGMENT BROADCASTING | 13/14 |
| | 4 | AKIHABARA | QQQ AMUSEMENT TOWER | Wi-Fi | — |
| | ... | | | | |

FIG.7

| COLLECTION-KEYWORD INFORMATION | SPOT ID | COLLECTION KEYWORD |
|---|---|---|
| | 1 | XXX TEMPLE, RESTAURANT |
| | 3 | YY TOWER |
| | : | |

FIG.8

| TERMINAL MANAGEMENT INFORMATION | TERMINAL ID | ADDRESS |
|---|---|---|
| | AMT01 | xxxxxxxxxxxxxxx |
| | : | |

FIG.9

| NEEDS MANAGEMENT INFORMATION | TERMINAL ID | NEEDS INFORMATION | SPOT ID | TIME STAMP |
|---|---|---|---|---|
| | AMT01 | TEMPURA BOWL (WANTS TO EAT) | 1 | |
| | AMT01 | TUNA (WANTS TO SEE TUNA FILLETING SHOW) | 2 | |
| | ... | ... | | |
| | BMT01 | DELICIOUS (SEAFOOD BOWL) | 112 | |
| | CMT03 | SAME (IS FINE) | 112 | |
| | | | | |

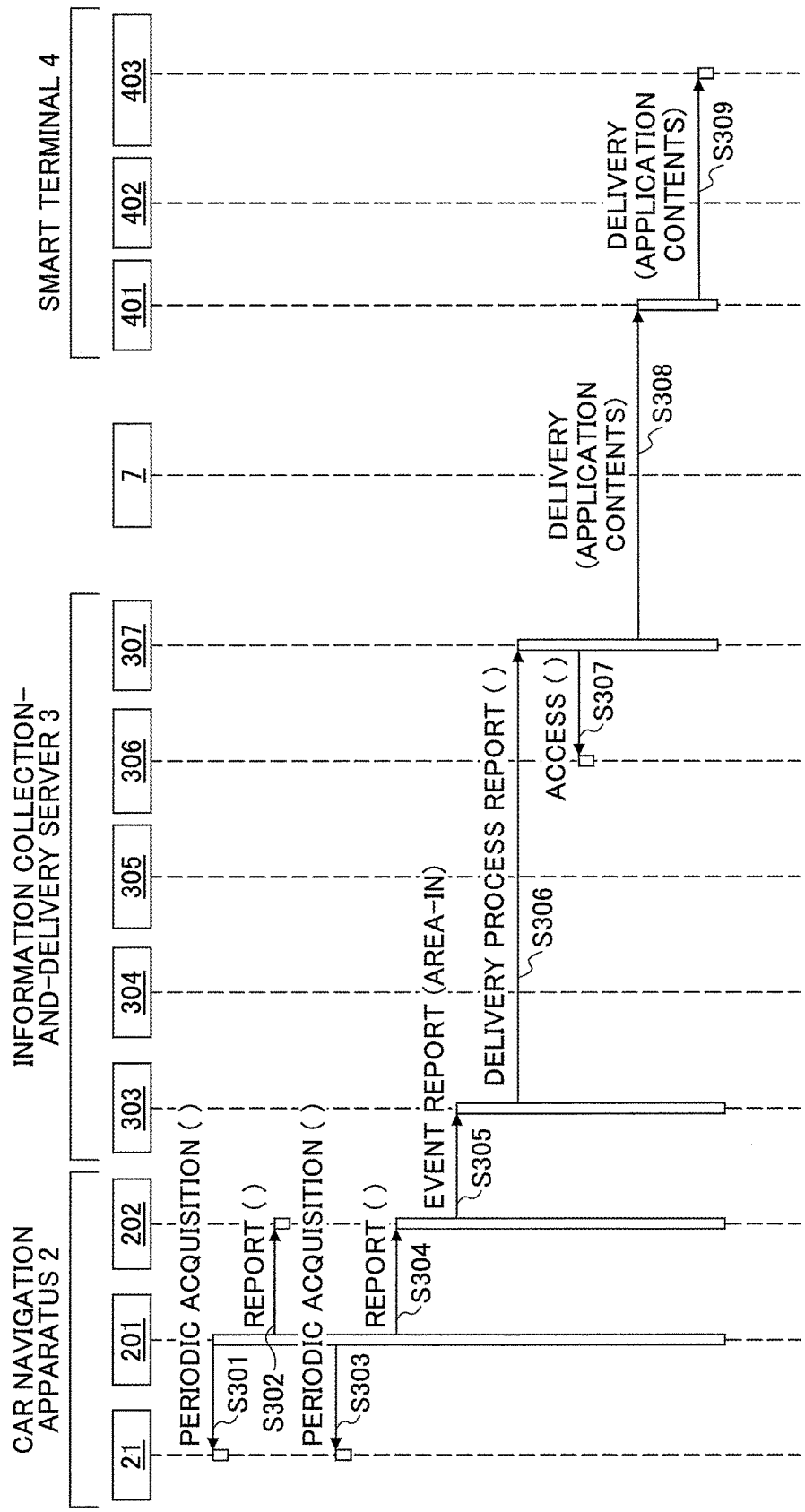

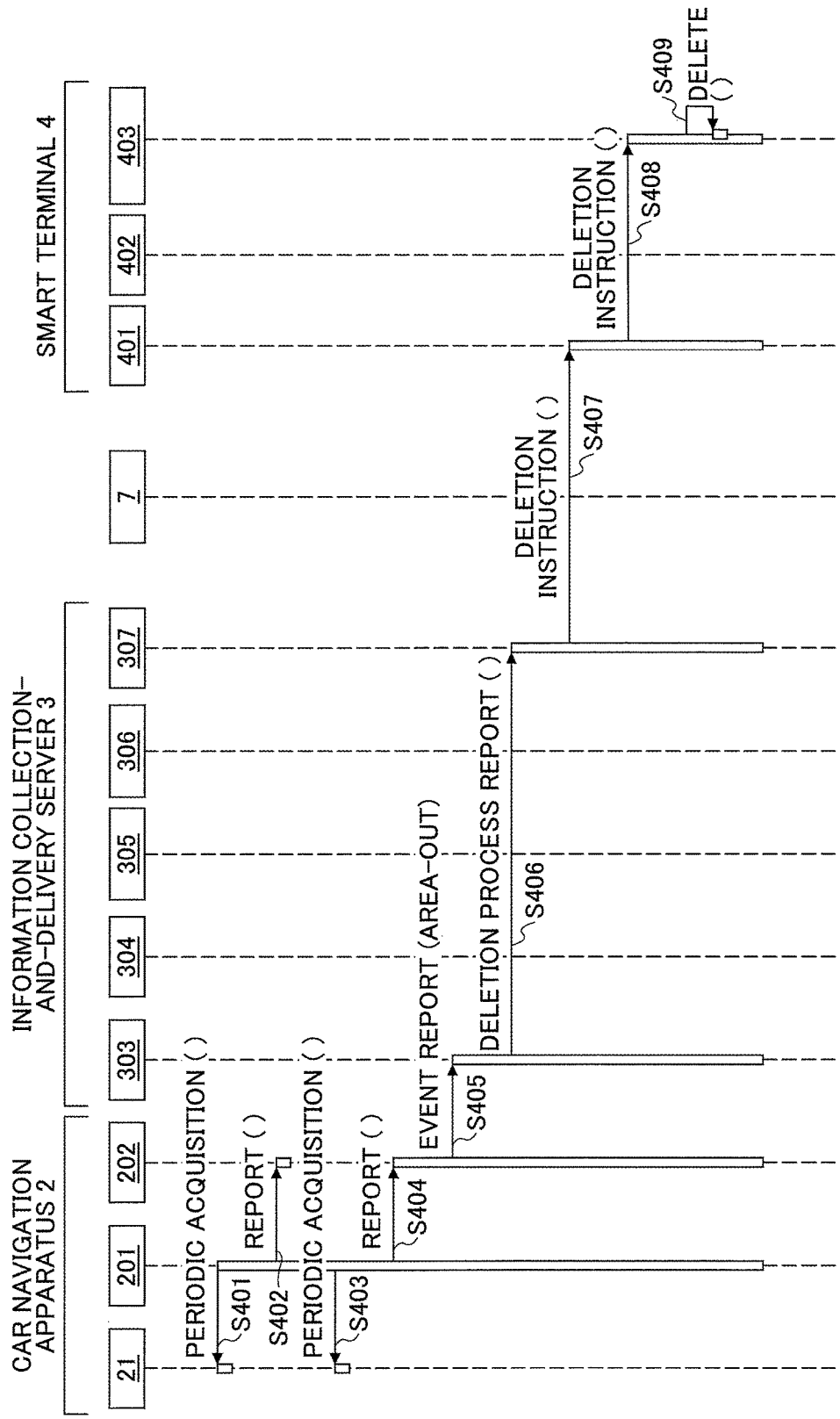

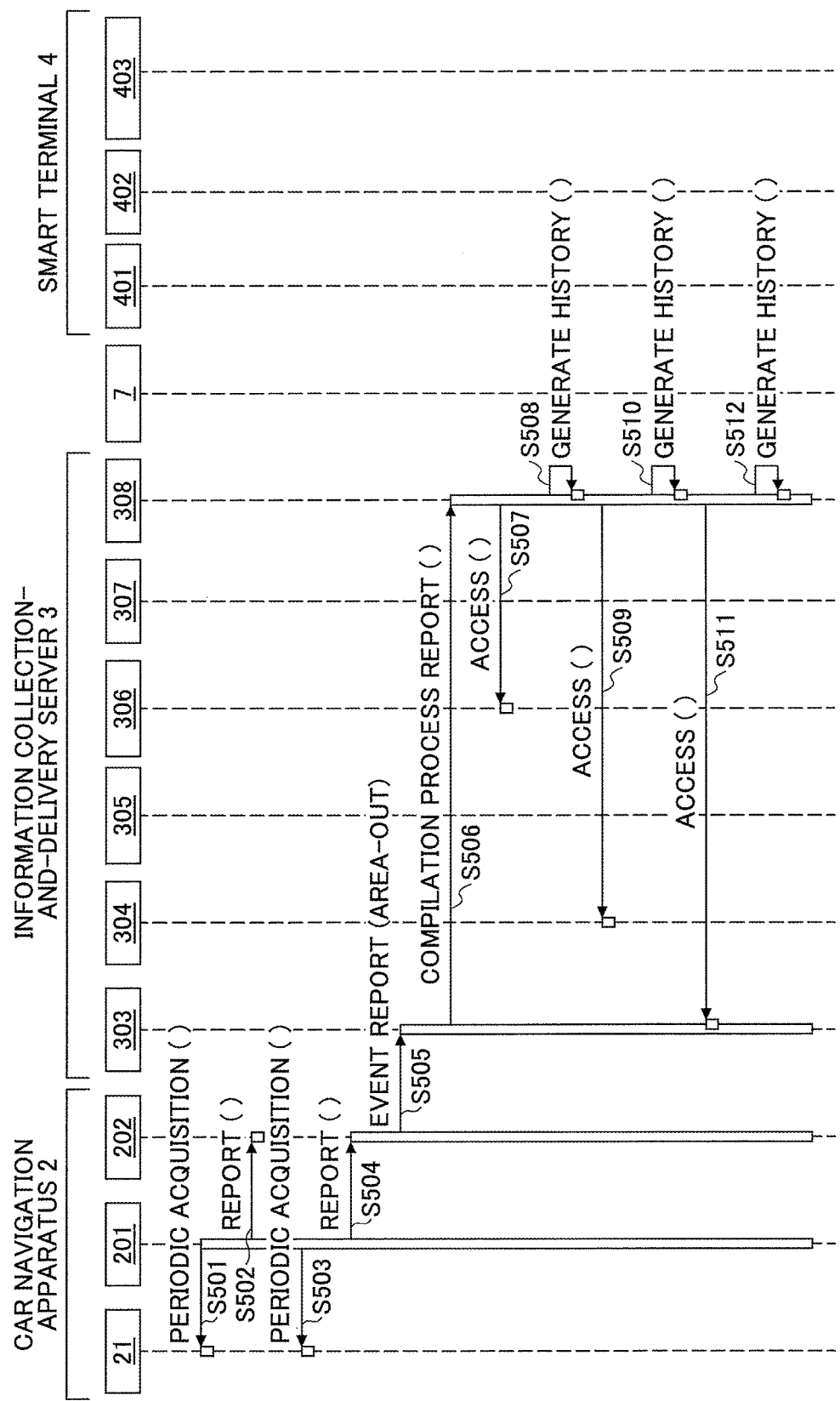

INFORMATION DELIVERY METHOD, INFORMATION DELIVERY APPARATUS, AND STORAGE MEDIUM

CROSS-REFERENCE TO RELATED APPLICATION

This application is based upon and claims the benefit of priority of Japanese Patent Application No. 2015-153420 filed on Aug. 3, 2015, the entire contents of which are incorporated herein by reference.

FIELD

An aspect of this disclosure relates to an information delivery method, an information delivery apparatus, and a storage medium.

BACKGROUND

Smart terminals have rapidly become widespread, and are becoming more popular than personal computers (PCs). A smart terminal, for example, includes a touch screen that is controllable by a simple gesture, a global positioning system (GPS) device for detecting positions, a 4th-generation (4G) communication device, a Wi-Fi communication device, and a near field communication (NFC) device for "touch" communication with a Felica service. Such a smart terminal is used as a mobile communication tool that is always carried by a user for communications with family members and friends.

A smart terminal is also used to obtain sightseeing information. For example, information on sightseeing spots can be obtained from information sites on the Internet and via limited-area one-segment broadcasting or a wireless network provided in a local area.

Also, there exists a technology for obtaining information such as sightseeing information from an information providing apparatus on a network by using an on-vehicle device (see, for example, Japanese Laid-Open Patent Publications No. 2002-340571, No. 2004-110101, No. 2013-117604, and No. 2009-19976).

As described above, there are various ways to obtain information on sightseeing spots. Here, when a user tries to obtain information on sightseeing spots from information sites on the Internet by using a smart terminal, the user needs to search for the information using a search site. However, it is tiresome for a user to determine a sightseeing spot or a destination and download frequently-updated information on the sightseeing spot in advance. Also, for example, if the user visits the sightseeing spot without reconfirming the downloaded information, it may happen that a scheduled event has already ended. Further, when the destination is changed, the time and effort spent to obtain the information are wasted.

On the other hand, to obtain sightseeing information on an area via limited-area one-segment broadcasting by using a smart terminal, a user needs to visit the area. That is, the user cannot obtain the sightseeing information beforehand.

Car navigation apparatuses have become popular, and are installed in many private cars and taxis. Geographical location information provided by a car navigation apparatus is accurate and is useful when, for example, moving between sightseeing spots. Also, there exist car navigation apparatuses that can provide information on sightseeing spots corresponding to the current location (see, for example, Japanese Laid-Open Patent Publications No. 2002-340571, No. 2004-110101, No. 2013-117604, and No. 2009-19976).

However, there are cases where it is difficult for a passenger other than the driver of a car to operate a car navigation apparatus. Particularly in a taxi, for safety reasons, a passenger is not allowed to operate a car navigation apparatus on behalf of the driver. On the other hand, it is difficult for the driver to understand the needs of a passenger and provide information matching the needs in real time while driving a car.

Also, there is a demand to view information obtained by a car navigation apparatus on one's favorite smart terminal. However, even if a function to transfer information from the car navigation apparatus to the smart terminal is available, it is bothersome to operate the smart terminal to communicate with the car navigation apparatus each time information is obtained, and the real-time nature of the information is also lost.

SUMMARY

According to an aspect of this disclosure, there is provided a method performed by a computer communicating with a terminal. The method includes when the computer enters a first area surrounding a second area together with the terminal, collecting one or more application contents corresponding to the second area from a service; when the computer enters the second area together with the terminal, delivering the collected application contents to the terminal; when the computer exits the second area together with the terminal, requesting the terminal to delete or nullify the delivered application contents; and when the computer exits the first area together with the terminal, organizing the collected application contents.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a table illustrating exemplary area definition information;

FIGS. 5A and 5B are tables illustrating exemplary route information;

FIG. 6A is a table illustrating exemplary information-delivery site information;

FIG. 6B is a table illustrating exemplary information-delivery spot information;

FIG. 7 is a table illustrating exemplary collection-keyword information;

FIG. 8 is a table illustrating exemplary terminal management information;

FIG. 9 is a table illustrating exemplary needs management information;

FIG. 14 is a sequence chart illustrating an exemplary information delivery process performed when a vehicle enters a second area;

FIG. 15 is a sequence chart illustrating an exemplary information deleting process performed when a vehicle exits a second area; and FIG. 16 is a sequence chart illustrating an exemplary information compilation process performed when a vehicle exits a first area.

DESCRIPTION OF EMBODIMENTS

Embodiments of the present invention are described below.

<<Configurations>>

Figure 1:
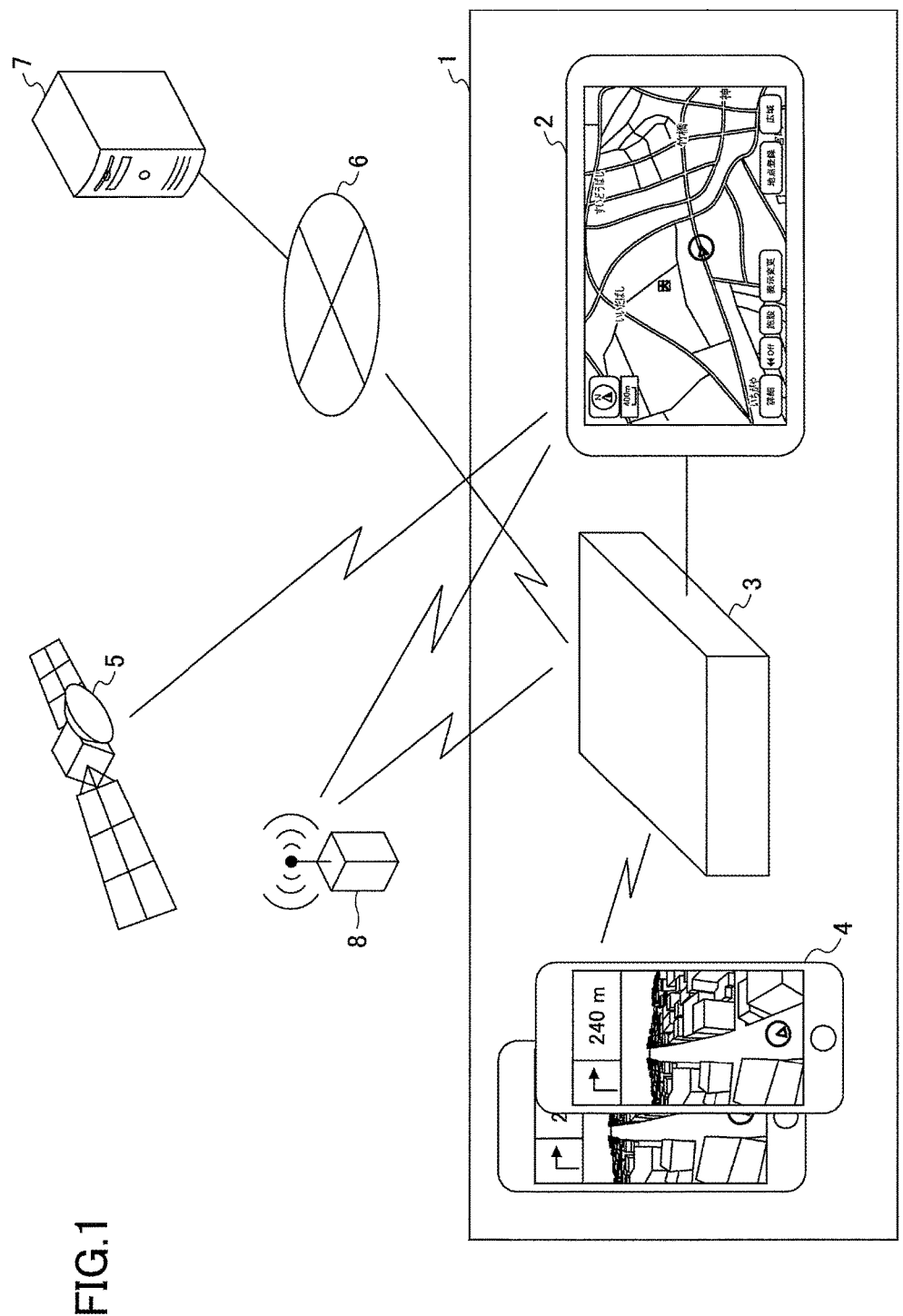
FIG. 1 is a drawing illustrating an exemplary configuration of a system according to an embodiment.

FIG. 1 is a drawing illustrating an exemplary configuration of a system according to an embodiment. As illustrated by FIG. 1, a vehicle 1 may include a car navigation apparatus 2 and an information collection-and-delivery server 3. Also, a smart terminal 4 of a user (driver or passenger) is present in the vehicle 1. The car navigation apparatus 2 and the information collection-and-delivery server 3 may be combined into a single apparatus.

The car navigation apparatus 2 receives a signal from a global positioning system (GPS) satellite 5 to obtain positional information, and also receives a limited-area broadcasting service 8 provided by one-segment/full-segment (1/Full-seg) broadcasting to obtain information including application contents (applications and/or contents). The information collection-and-delivery server 3 obtains information including application contents via a communication network 6 from an external search service 7, receives the limited-area broadcasting service 8 to obtain information including application contents, and delivers the obtained information via radio communications to the smart terminal 4.

The information collection-and-delivery server 3 may be configured to obtain information via the car navigation apparatus 2 from the limited-area broadcasting service 8. In this case, the information collection-and-delivery server 3 may not necessarily include a function to directly receive information from the limited-area broadcasting service 8. When the car navigation apparatus 2 includes a function to access the external search service 7 via the communication network 6 and the information collection-and-delivery server 3 is configured to access the external search service 7 via the car navigation apparatus 2, the information collection-and-delivery server 3 may not necessarily have a function to communicate with the communication network 6. In the descriptions below, it is assumed that the car navigation apparatus 2 obtains positional information via the GPS. However, the car navigation apparatus 2 may be configured to obtain positional information by any other method (e.g., a method for estimating a position based on strengths of signals received from multiple radio base stations).

Figure 2:
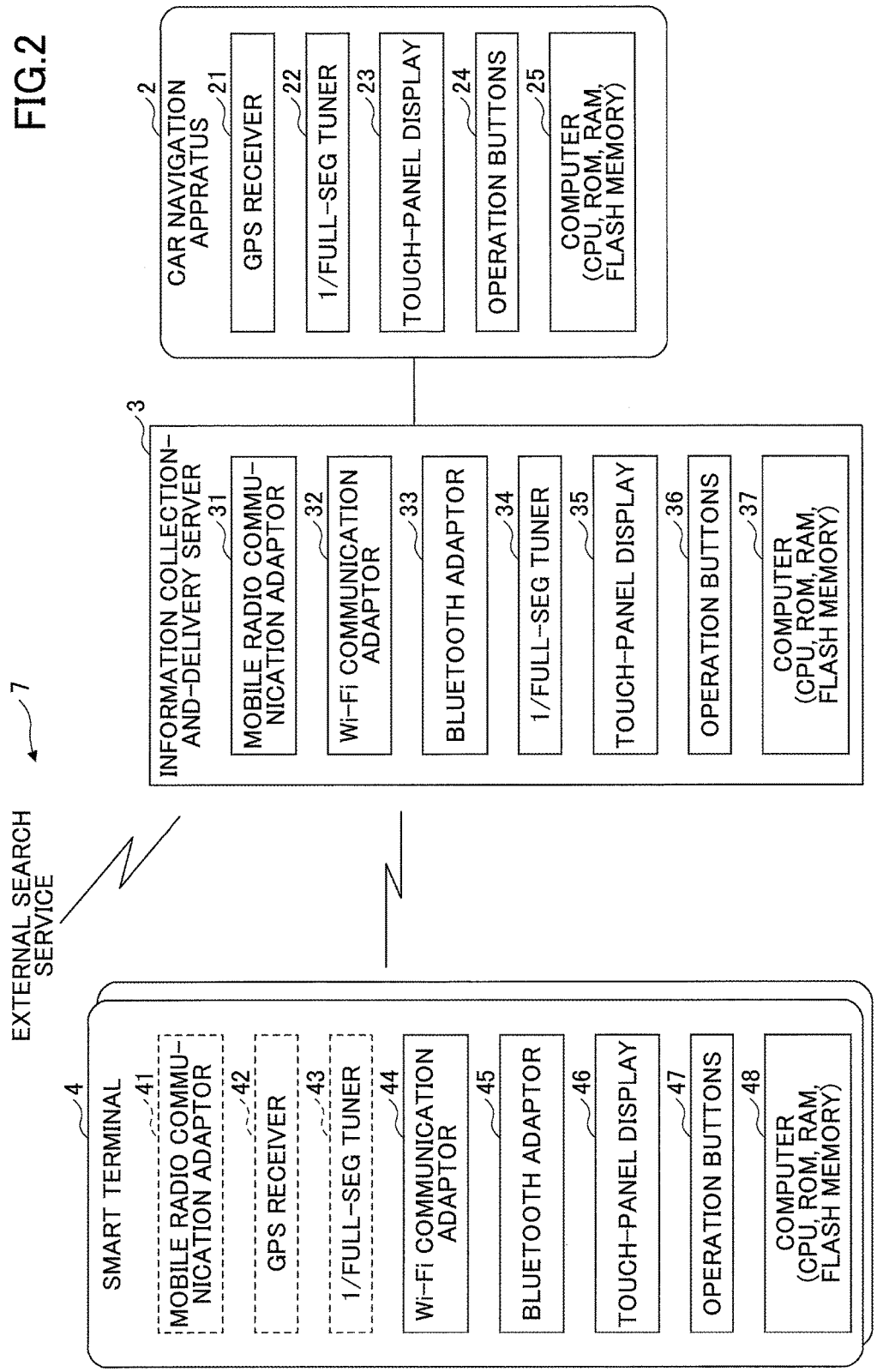
FIG. 2 is a block diagram illustrating exemplary hardware configurations of a car navigation apparatus, an information collection-and-delivery server, and a smart terminal.

FIG. 2 is a block diagram illustrating exemplary hardware configurations of the car navigation apparatus 2, the information collection-and-delivery server 3, and the smart terminal 4. As illustrated by FIG. 2, the car navigation apparatus 2 may include a GPS receiver 21, an 1/Full-seg tuner 22, a touch-panel display 23, operation buttons 24, and a computer 25. The GPS receiver 21 receives a signal from the GPS satellite 5. The 1/Full-seg tuner 22 receives a broadcast from the limited-area broadcasting service 8. The touch-panel display 23 displays information for a user and receives user operations. The operation buttons 24 receive user operations. The computer 25 may include a central processing unit (CPU), a read-only memory (ROM), a random access memory (RAM), and a flash memory, and is configured to perform information processing.

The information collection-and-delivery server 3 may include a mobile radio communication adaptor 31, a Wi-Fi (registered trademark) communication adaptor 32, a Bluetooth (registered trademark) adaptor 33, an 1/Full-seg tuner 34, a touch-panel display 35, operation buttons 36, and a computer 37. The mobile radio communication adaptor 31 connects the information collection-and-delivery server 3 to a mobile radio network and performs data communications. The Wi-Fi communication adaptor 32 performs data communications with other apparatuses via Wi-Fi connections. The Bluetooth adaptor 33 performs data communications with other apparatuses via Bluetooth connections. The 1/Full-seg tuner 34 receives a broadcast from the limited-area broadcasting service 8. The touch-panel display 35 displays information for a user and receives user operations. The operation buttons 36 receive user operations. The computer 37 may include a CPU, a ROM, a RAM, and a flash memory, and is configured to perform information processing.

The smart terminal 4 may include a mobile radio communication adaptor 41, a GPS receiver 42, an 1/Full-seg tuner 43, a Wi-Fi communication adaptor 44, a Bluetooth adaptor 45, a touch-panel display 46, operation buttons 47, and a computer 48. The mobile radio communication adaptor 41 connects the smart terminal 4 to a mobile radio network and performs data communications. The GPS receiver 42 receives a signal from the GPS satellite 5. The 1/Full-seg tuner 43 receives a broadcast from the limited-area broadcasting service 8. The Wi-Fi communication adaptor 44 performs data communications with other apparatuses via Wi-Fi connections. The Bluetooth adaptor 45 performs data communications with other apparatuses via Bluetooth connections. The touch-panel display 46 displays information for a user and receives user operations. The operation buttons 47 receive user operations. The computer 48 may include a CPU, a ROM, a RAM, and a flash memory, and is configured to perform information processing.

In the present embodiment, it is assumed that application contents are delivered from the information collection-and-delivery server 3 via Wi-Fi communications and Bluetooth communications. For this reason, the mobile radio communication adaptor 41 and the 1/Full-seg tuner 43 are not actively used. Also in the present embodiment, because positional information is obtained by the car navigation apparatus 2, the GPS receiver 42 is not actively used.

Figure 3:
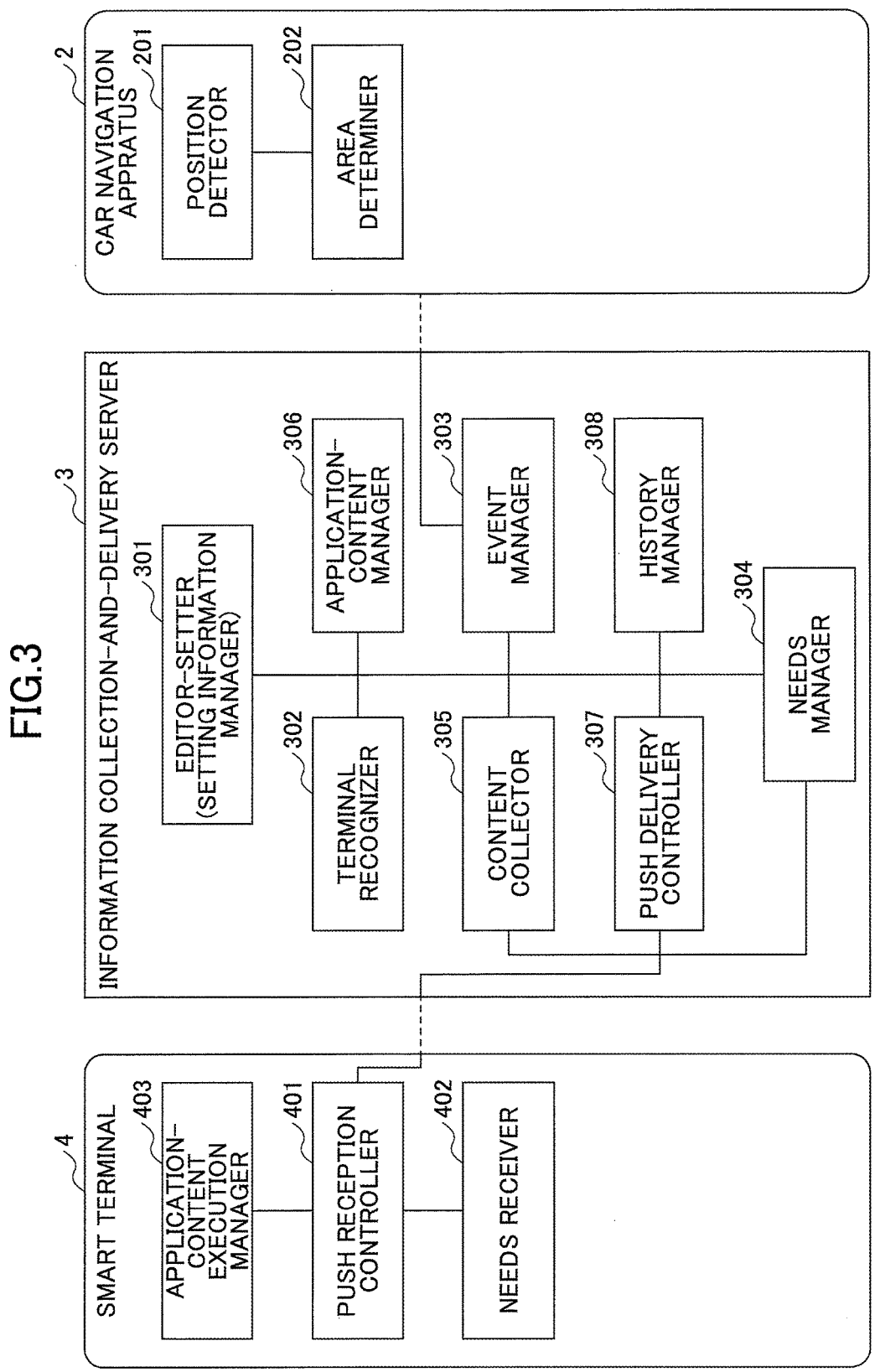
FIG. 3 is a block diagram illustrating exemplary functional configurations of a car navigation apparatus, an information collection-and-delivery server, and a smart terminal.

FIG. 3 is a block diagram illustrating exemplary functional configurations of the car navigation apparatus 2, the information collection-and-delivery server 3, and the smart terminal 4. As illustrated by FIG. 3, the car navigation apparatus 2 may include a position detector 201 and an area determiner 202. The position detector 201 measures the current position of the car navigation apparatus 2 (or the vehicle 1) based on a signal received by the GPS receiver 21 (FIG. 2). The area determiner 202 determines entry and exit of the vehicle 1 into and from areas specified by the information collection-and-delivery server 3.

The information collection-and-delivery server 3 may include an editor-setter 301, a terminal recognizer 302, an event manager 303, a needs manager 304, a content collector 305, an application-content manager 306, a push delivery controller 307, and a history manager 308. The editor-setter 301 receives, from an administrator (e.g., a person in a taxi company), instructions to edit and set information items such as area definition information, route information, information-delivery site information, information-delivery spot information, and collection keywords. Details of the above information items are described later.

The terminal recognizer 302 recognizes a nearby smart terminal 4 based on a response to a broadcast signal sent from, for example, the Wi-Fi communication adaptor 32 (FIG. 2) and registers the recognized smart terminal 4. The event manager 303 sets area information in the area determiner 202 of the car navigation apparatus 2, and performs a process in response to an event detected by the area determiner 202. Examples of events include "Area-In" indicating that the vehicle 1 has entered a specified area and "Area-Out" indicating that the vehicle 1 has exited the specified area. At each point of time, the event manager 303 sets a second area surrounding a spot that is the next destination, and a first area that surrounds the second area and in which collection of information is started to prepare for information delivery in the second area.

The needs manager 304 obtains needs information from the user of the smart terminal 4 when Area-In into the first area is detected and information is collected. The obtained needs information is used to select application contents to be delivered. The content collector 305 collects (or obtains) information including application contents from the external search service 7 and/or the limited-area broadcasting service 8. The application-content manager 306 stores the collected information including application contents. The push delivery controller 307 delivers application contents by push delivery (information delivery using a push delivery mechanism of an operating system of the smart terminal 4) to the smart terminal 4. The history manager 308 organizes delivered information (including information that has not been selected and has not been actually delivered) to generate a history, and stores the generated history.

The smart terminal 4 may include a push reception controller 401, a needs receiver 402, and an application-content execution manager 403. The push reception controller 401 performs a process in response to reception of application contents from the push delivery controller 307 of the information collection-and-delivery server 3. The needs receiver 402 provides an interface to allow a user to select or enter needs information and receives the selected or entered needs information in response to receiving an Area-In event report indicating entry into the first area from the needs manager 304 of the information collection-and-delivery server 3. The application-content execution manager 403 executes application contents delivered from the push delivery controller 307 of the information collection-and-delivery server 3, and thereby presents the application contents to the user.

The functional components illustrated in FIG. 3 may be implemented by executing programs by the CPUs (FIG. 2) of the car navigation apparatus 2, the information collection-and-delivery server 3, and the smart terminal 4. The programs may be provided via storage media or downloaded via a network.

FIG. 4 is a table illustrating exemplary area definition information set in the event manager 303. The area definition information may include information items such as "spot name (name of central place of area)", "area type", "second area location #1 (latitude, longitude)", "second area location #2 (latitude, longitude, radius (m))", "second area event definition", "first area location #1 (latitude, longitude)", "first area location #2 (latitude, longitude, radius (m))", and "first area event definition". The "first area location #1 (latitude, longitude)" and the "first area location #2 (latitude, longitude, radius (m))" indicate the latitudes and longitudes of opposite corners of a rectangle when the "area type" is "square (rectangle)", and indicate the latitude and longitude of the center of a circle and the radius of the circle when the "area type" is "circle". The same applies to the "second area location #1 (latitude, longitude)" and the "second area location #2 (latitude, longitude, radius (m))".

FIGS. 5A and 5B are tables illustrating examples of route information set in the event manager 303. The route information includes information items "spot ID" and "spot name" for each of spots that are arranged in the order they are to be visited.

FIGS. 6A and 6B are tables illustrating exemplary information-delivery site information and exemplary information-delivery spot information that are set in the application-content manager 306. The information-delivery site information may include information items such as "priority", "target site", and "collection policy". The information-delivery spot information may include information items such as "spot ID", "spot name", "delivery facility", "reception method", and "channel".

FIG. 7 is a table illustrating exemplary collection-keyword information set in the application-content manager 306. The collection-keyword information may include information items such as "spot ID" and "collection keyword".

FIG. 8 is a table illustrating exemplary terminal management information that is dynamically maintained in the terminal recognizer 302. The terminal management information may include information items such as "terminal ID" and "address".

FIG. 9 is a table illustrating exemplary needs management information that is dynamically maintained in the needs manager 304. The needs management information may include information items such as "terminal ID", "needs information", "spot ID", and "time stamp".

<<Processes>>

Exemplary processes performed in the system of the present embodiment are described below.

<Information Setting Process>

Figure 10:
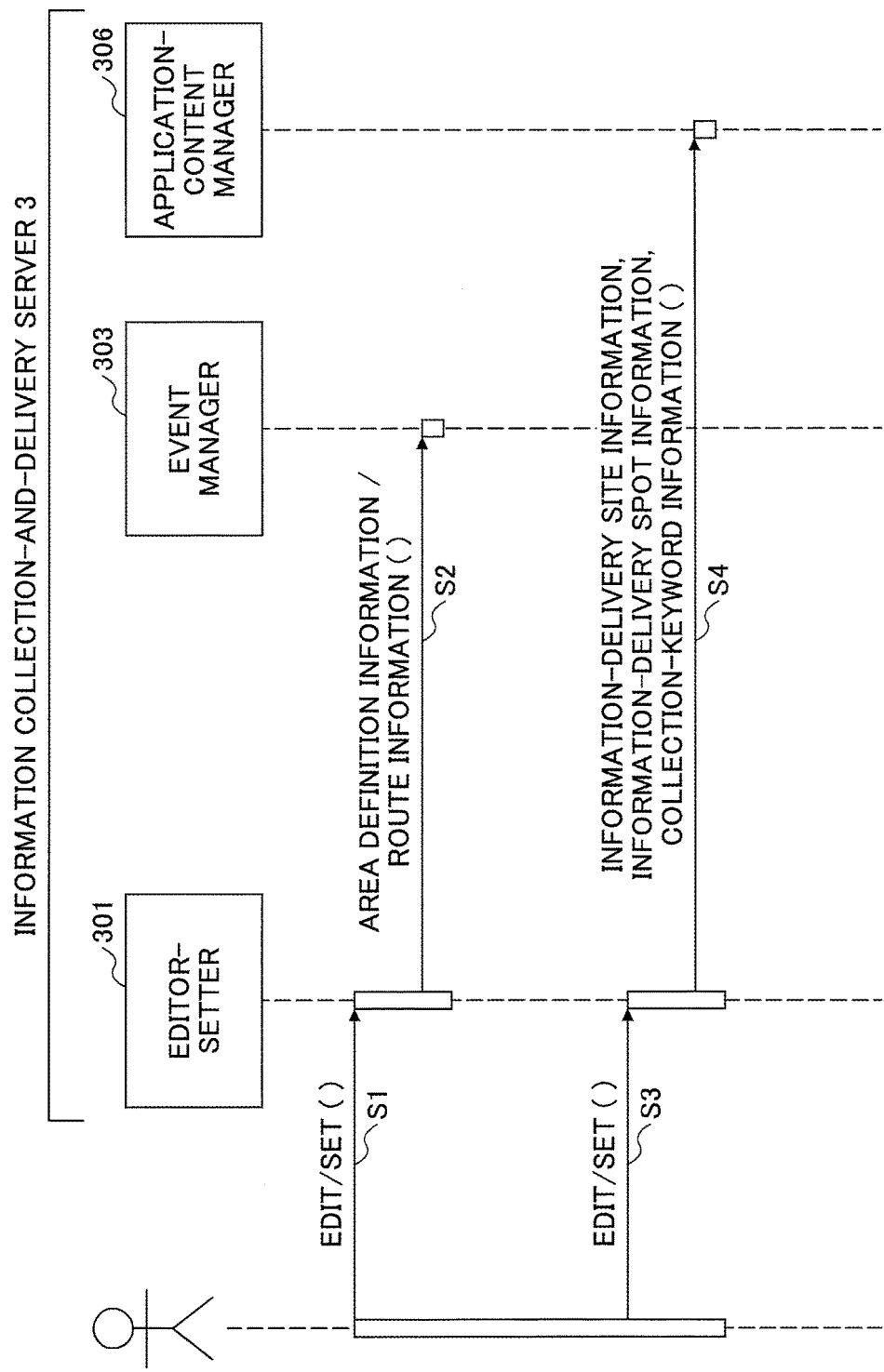
FIG. 10 is a sequence chart illustrating an exemplary information setting process.

FIG. 10 is a sequence chart illustrating an exemplary information setting process. In FIG. 10, when an administrator (e.g., a person in a taxi company) inputs an instruction to edit or set area definition information and/or route information to the editor-setter 301 of the information collection-and-delivery server 3 (step S1), the editor-setter 301 reports the area definition information and/or the route information to the event manager 303 (step S2). In response, the event manager 303 registers the area definition information (FIG. 4) and/or the route information (FIG. 5).

Also, when the administrator inputs an instruction to edit or set information-delivery site information, information-delivery spot information, and/or collection-keyword information to the editor-setter 301 of the information collection-and-delivery server 3 (step S3), the editor-setter 301 reports the information-delivery site information, the information-delivery spot information, and/or the collection-keyword information to the application-content manager 306 (step S4). In response, the application-content manager 306 registers the information-delivery site information (FIG. 6A), the information-delivery spot information (FIG. 6B), and/or the collection-keyword information (FIG. 7).

<Processes Performed According to Movement of Vehicle>

Figure 11:
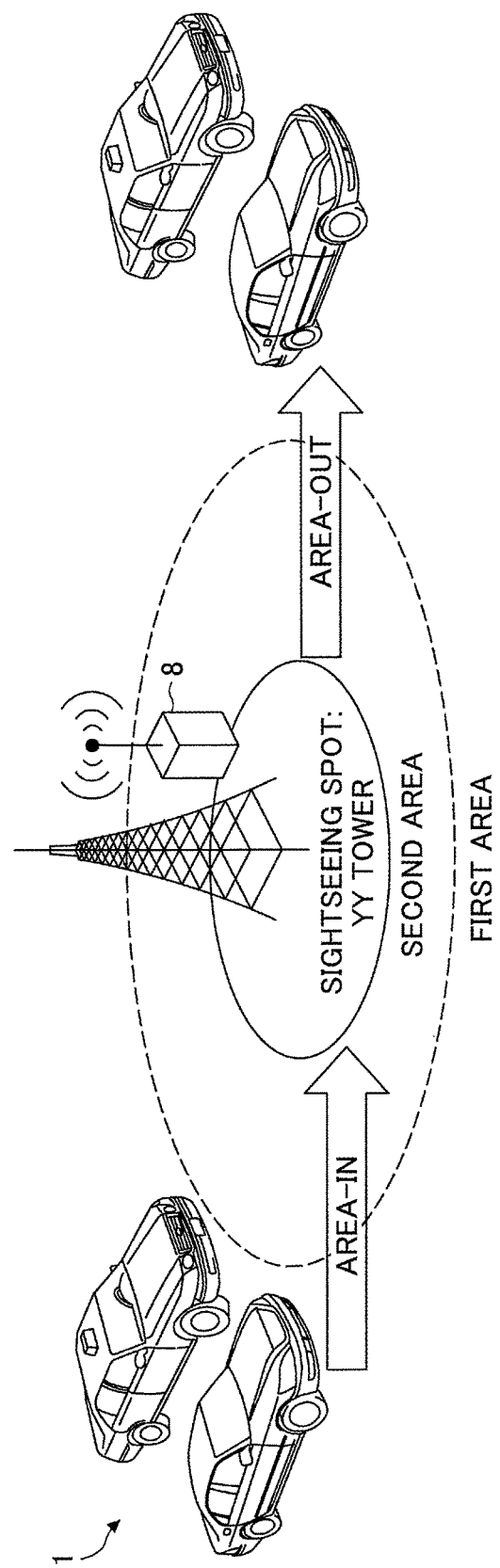
FIG. 11 is a drawing illustrating exemplary movement of a vehicle.

FIG. 11 is a drawing illustrating exemplary movement of the vehicle 1. In FIG. 11, the first area and the second area defined for the spot name "YY tower" in the area definition information of FIG. 4 are used as examples.

Figure 12:
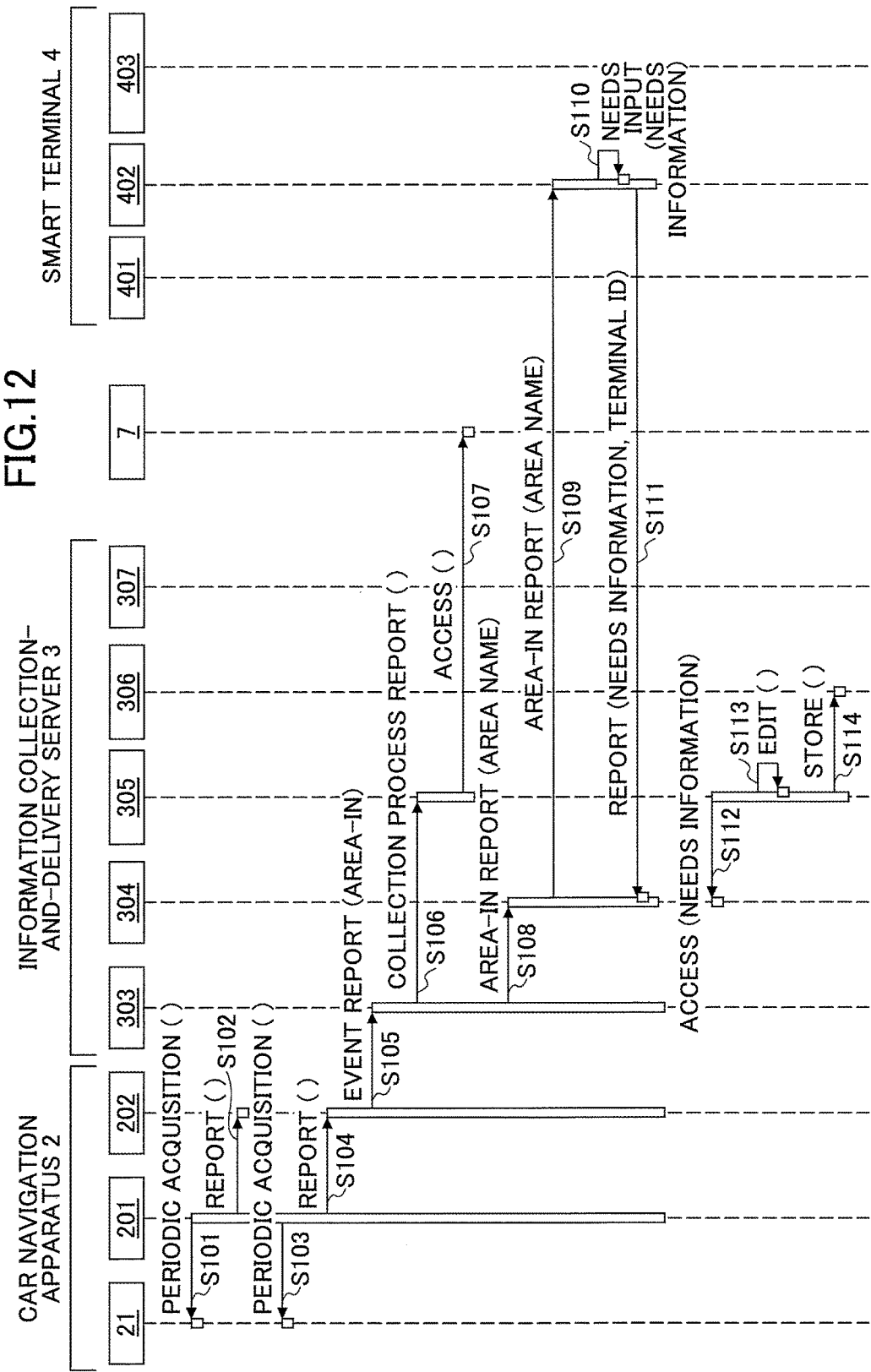
FIG. 12 is a sequence chart illustrating an exemplary information collection process performed when a vehicle enters a first area.

FIG. 12 is a sequence chart illustrating an exemplary information collection process performed when the vehicle 1 enters the first area. When the vehicle 1 enters the first area (Area-In), an information collection process for collecting application-content information (application contents) is started according to the first area event definition "Area-In: Collection" in the area definition information of FIG. 4.

In FIG. 12, the position detector 201 of the car navigation apparatus 2 of the vehicle 1 periodically obtains vehicle position information from the GPS receiver 21 (steps S101 and S103), and reports the vehicle position information to the area determiner 202 (steps S102 and S104).

The area determiner 202 compares the vehicle position information with a range defined by the first area location #1 and the first area location #2 for the spot name "YY tower" in the area definition information of FIG. 4, and determines that the vehicle 1 has entered the first area. Then, the area determiner 202 reports an event "Area-In" indicating the entry into the first area to the event manager 303 of the information collection-and-delivery server 3 (step S105).

According to the first area event definition "Area-In: Collection" in the area definition information of FIG. 4, the event manager 303 sends a collection process report to the content collector 305 (step S106).

The content collector 305 searches for and collects application contents via the external search service 7 based on the information-delivery site information of FIG. 6A (step S107). In searching for application contents, the collection-keyword information of FIG. 7 is also used.

Concurrently, the event manager 303 also reports the area name of the first area to the needs manager 304 (step S108). The needs manager 304 reports the area name to the needs receiver 402 of the smart terminal 4 (step S109). When the area name is reported, the needs receiver 402, for example, causes the smart terminal 4 to make a notification sound or vibrate in order to enable the passenger or the driver of the vehicle 1 to notice a change in vehicle context (status such as the current position of the vehicle 1) and cause the passenger or the driver to look at the screen of the smart terminal 4. Then, the needs receiver 402 displays an interface together with the area name to request the passenger or the driver to enter needs information, and obtains the entered needs information (step S110).

For example, the needs receiver 402 displays, together with the area name, a user interface to allow a user to select needs information from a menu. Also, the needs receiver 402 may be configured to allow a user to enter needs information via a text input or a voice input. Further, the needs receiver 402 may be configured to extract needs information from text written in a natural language by using a known morphological analysis technique for dividing text into morphemes that are minimum meaningful units of a language. Examples of needs information are provided in FIG. 9.

Referring back to FIG. 12, the needs receiver 402 reports the obtained needs information together with a terminal ID to the needs manager 304 of the information collection-and-delivery server 3 (step S111). The needs manager 304 registers and manages the needs information reported from the needs receiver 402.

The content collector 305 obtains the needs information from the needs manager 304 (step S112), filters (or selects) the collected application contents based on the needs information to generate delivery information (step S113), and stores the delivery information in the application-content manager 306 (step S114).

Figure 13:
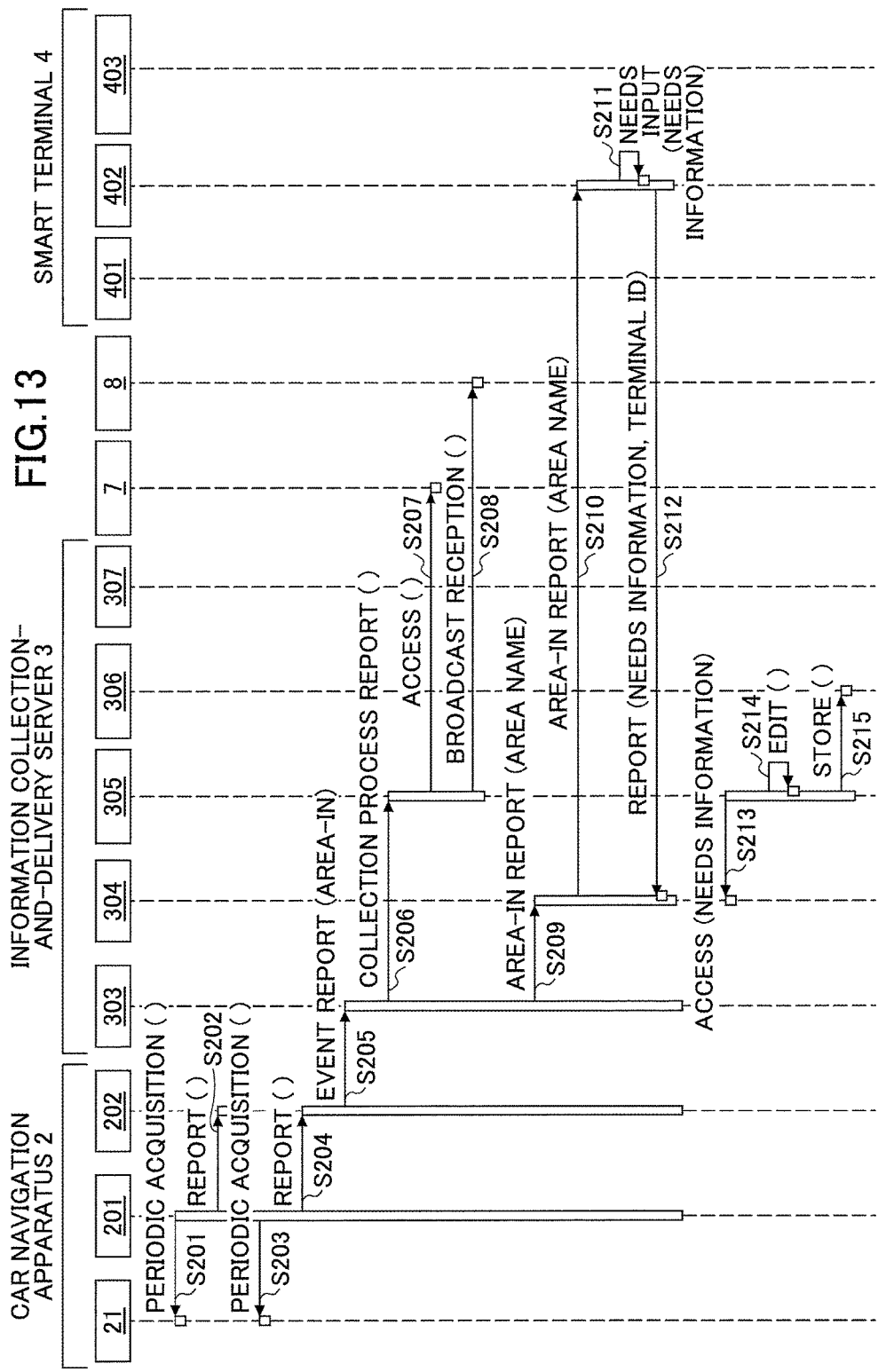
FIG. 13 is a sequence chart illustrating another exemplary information collection process performed when a vehicle enters a first area.

FIG. 13 is a sequence chart illustrating another exemplary information collection process performed when the vehicle 1 enters the first area. In the information collection process, application contents are collected not only from the external search service 7 but also from the limited-area broadcasting service 8.

Steps S201 through S206 (up to the step where the collection process report is sent from the event manager 303 to the content collector 305) of FIG. 13 are substantially the same as steps S101 through S106 of FIG. 12. After step S206, the content collector 305 searches for and collects application contents via the external search service 7 and the limited-area broadcasting service 8 based on the information-delivery site information of FIG. 6A and the information-delivery spot information of FIG. 6B (steps S207 and S208). In searching for application contents, the collection-keyword information of FIG. 7 is also used. The subsequent steps are substantially the same as the corresponding steps of FIG. 12.

FIG. 14 is a sequence chart illustrating an exemplary information delivery process performed when the vehicle 1 enters the second area. When the vehicle enters the second area (Area-In), an information delivery process for delivering application-content information (application contents) is performed according to the second area event definition "Area-In: Delivery" in the area definition information of FIG. 4.

In FIG. 14, the position detector 201 of the car navigation apparatus 2 of the vehicle 1 periodically obtains vehicle position information from the GPS receiver 21 (steps S301 and S303), and reports the vehicle position information to the area determiner 202 (steps S302 and S304).

The area determiner 202 compares the vehicle position information with a range defined by the second area location #1 and the second area location #2 for the spot name "YY tower" in the area definition information of FIG. 4, and determines that the vehicle has entered the second area. Then, the area determiner 202 reports an event "Area-In" indicating the entry into the second area to the event manager 303 of the information collection-and-delivery server 3 (step S305).

According to the second area event definition "Area-In: Delivery" in the area definition information of FIG. 4, the event manager 303 sends a delivery process report to the push delivery controller 307 (step S306).

The push delivery controller 307 accesses the application-content manager 306 to obtain application contents (step S307), and delivers the application contents via the push reception controller 401 of the smart terminal 4 to the application-content execution manager 403 (steps S308 and S309). The delivered application contents may be automatically executed and displayed on the smart terminal 4. This configuration makes it possible to deliver the application contents to the smart terminal 4 and enable the user of the smart terminal 4 to use the delivered application contents at the right timing, i.e., when the vehicle arrives at the destination spot. Also with the above configuration, the smart terminal 4 does not have to search for and collect application contents by itself. This in turn makes it possible to reduce battery consumption of the smart terminal 4 and to use the remaining battery power to, for example, take photographs at a sightseeing spot.

FIG. 15 is a sequence chart illustrating an exemplary information deleting process performed when the vehicle 1 exits the second area. When the vehicle 1 exits the second area (Area-Out), an information deleting process for deleting application-content information (application contents) is performed according to the second area event definition "Area-Out: Deletion" in the area definition information of FIG. 4.

In FIG. 15, the position detector 201 of the car navigation apparatus 2 of the vehicle 1 periodically obtains vehicle position information from the GPS receiver 21 (steps S401 and S403), and reports the vehicle position information to the area determiner 202 (steps S402 and S404).

The area determiner 202 compares the vehicle position information with a range defined by the second area location #1 and the second area location #2 for the spot name "YY tower" in the area definition information of FIG. 4, and determines that the vehicle 1 has exited the second area. Then, the area determiner 202 reports an event "Area-Out" indicating the exit from the second area to the event manager 303 of the information collection-and-delivery server 3 (step S405).

According to the second area event definition "Area-Out: Deletion" in the area definition information of FIG. 4, the event manager 303 sends a deletion process report to the push delivery controller 307 (step S406).

The push delivery controller 307 sends a deletion instruction via the push reception controller 401 of the smart terminal 4 to the application-content execution manager 403 (steps S407 and S408). In response to the deletion instruction, the application-content execution manager 403 deletes (or nullifies) the application contents that have been delivered (step S409). This configuration makes it possible to automatically delete application contents automatically delivered to the smart terminal 4, and to prevent the user from being confused by application contents that have become useless.

FIG. 16 is a sequence chart illustrating an exemplary information compilation process performed after the vehicle 1 exits the first area. When the vehicle 1 exits the first area (Area-Out), an information compilation (or organization) process for organizing or compiling application-content information (application contents) is performed according to the first area event definition "Area-Out: Compilation (or Organization)" in the area definition information of FIG. 4.

In FIG. 16, the position detector 201 of the car navigation apparatus 2 of the vehicle 1 periodically obtains vehicle position information from the GPS receiver 21 (steps S501 and S503), and reports the vehicle position information to the area determiner 202 (steps S502 and S504).

The area determiner 202 compares the vehicle position information with a range defined by the first area location #1 and the first area location #2 for the spot name "YY tower" in the area definition information of FIG. 4, and determines that the vehicle 1 has exited the first area. Then, the area determiner 202 reports an event "Area-Out" indicating the exit from the first area to the event manager 303 of the information collection-and-delivery server 3 (step S505).

According to the first area event definition "Area-Out: Compilation" in the area definition information of FIG. 4, the event manager 303 sends a compilation process report to the history manager 308 (step S506).

The history manager 308 obtains the application contents stored in the application-content manager 306 (step S507) and generates a history of the application contents (step S508). Similarly, the history manager 308 obtains the needs information from the needs manager 304 (step S509), and generates a history of the needs information (step S510). Further, the history manager 308 obtains event information (information indicating occurred events) from the event manager 303 (step S511), and generates a history of the event information (step S512). The generated histories (or organized information) may be used, for example, to analyze sightseeing activities of passengers and to improve services provided by taxi drivers.

<<SUMMARY>>

As described above, an aspect of this disclosure provides an information delivery method, an information delivery apparatus, and a storage medium that can automatically collect information according to movement of a movable body and can automatically deliver the collected information to a user terminal.

The smart terminal 4 is an example of a terminal. Each of the external search service 7 and the limited-area broadcasting service 8 is an example of a service.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a computer communicating with a terminal, the method comprising:
   when the computer enters a first area, which is larger than and includes a second area, together with the terminal and when the computer is located outside of the second area, collecting one or more application contents corresponding to the second area from a service;
   when the computer enters the second area together with the terminal, sending, to the terminal, a report that includes identification information of the second area and requests a user of the terminal to enter needs information, and obtaining the entered needs information from the terminal as a response to the report;
   filtering the collected application contents based on the obtained needs information, and sending the filtered application contents to the terminal;
   when the computer exits the second area together with the terminal, requesting the terminal to delete or nullify the delivered application contents; and
   when the computer exits the first area together with the terminal, organizing the collected application contents, wherein
   the computer stores area definition information that includes a location of the first area, an action to be performed when the computer enters the first area but has not yet entered the second area, an action to be performed when the computer exits the first area including the second area, a location of the second area, an action to be performed when the computer enters the second area, and an action to be performed when the computer exits the second area; and the computer performs the method by referring to the area definition information upon detecting entries and exits of the computer into and from the first area and the second area.

2. The method as claimed in claim 1, wherein the application contents are collected from at least one of a search service on a network and a limited-area broadcasting service.

3. The method as claimed in claim 1, wherein the first area and the second area are defined for each of spots in route information defining a route of movement.

4. The method as claimed in claim 1, wherein the application contents are collected based on predefined information that identifies the service.

5. A non-transitory computer-readable storage medium storing therein a program that causes a computer communicating with a terminal to execute a process comprising:
when the computer enters a first area, which is larger than and includes a second area, together with the terminal and when the computer is located outside of the second area, collecting one or more application contents corresponding to the second area from a service;
when the computer enters the second area together with the terminal, sending, to the terminal, a report that includes identification information of the second area and requests a user of the terminal to enter needs information, and obtaining the entered needs information from the terminal as a response to the report;
filtering the collected application contents based on the obtained needs information, and sending the filtered application contents to the terminal;
when the computer exits the second area together with the terminal, requesting the terminal to delete or nullify the delivered application contents; and
when the computer exits the first area together with the terminal, organizing the collected application contents, wherein
the computer stores area definition information that includes a location of the first area, an action to be performed when the computer enters the first area but has not yet entered the second area, an action to be performed when the computer exits the first area including the second area, a location of the second area, an action to be performed when the computer enters the second area, and an action to be performed when the computer exits the second area; and
the program causes the computer to execute the process by referring to the area definition information upon detecting entries and exits of the computer into and from the first area and the second area.

6. The non-transitory computer-readable storage medium as claimed in claim 5, wherein the application contents are collected from at least one of a search service on a network and a limited-area broadcasting service.

7. The non-transitory computer-readable storage medium as claimed in claim 5, wherein the first area and the second area are defined for each of spots in route information defining a route of movement.

8. The non-transitory computer-readable storage medium as claimed in claim 5, wherein the application contents are collected based on predefined information that identifies the service.

9. An apparatus communicating with a terminal, the apparatus comprising:
a processor configured to execute a process including
when the apparatus enters a first area, which is larger than and includes a second area, together with the terminal and when the apparatus is located outside of the second area, collecting one or more application contents corresponding to the second area from a service;
when the apparatus enters the second area together with the terminal, sending, to the terminal, a report that includes identification information of the second area and requests a user of the terminal to enter needs information, and obtaining the entered needs information from the terminal as a response to the report;
filtering the collected application contents based on the obtained needs information, and sending the filtered application contents to the terminal;
when the apparatus exits the second area together with the terminal, requesting the terminal to delete or nullify the delivered application contents; and
when the apparatus exits the first area together with the terminal, organizing the collected application contents, wherein
the apparatus stores area definition information that includes a location of the first area, an action to be performed when the apparatus enters the first area, but has not yet entered the second area an action to be performed when the apparatus exits the first area including the second area, a location of the second area, an action to be performed when the apparatus enters the second area, and an action to be performed when the apparatus exits the second area; and
the processor executes the process by referring to the area definition information upon detecting entries and exits of the apparatus into and from the first area and the second area.

10. The apparatus as claimed in claim 9, wherein the processor collects the application contents from at least one of a search service on a network and a limited-area broadcasting service.

11. The apparatus as claimed in claim 9, wherein the first area and the second area are defined for each of spots in route information defining a route of movement.

12. The apparatus as claimed in claim 9, wherein the processor collects the application contents based on predefined information that identifies the service.

* * * * *